United States Patent
Shah et al.

(10) Patent No.: US 10,699,223 B1
(45) Date of Patent: Jun. 30, 2020

(54) SYSTEM AND METHOD FOR RESOURCE ALLOCATION ACROSS DISTINCT PROCESSES OF A MATERIALS HANDLING FACILITY

(75) Inventors: Sameer Vinod Shah, Seattle, WA (US); Srinivas Palla, Seattle, WA (US); Robert D. McDonald, Jr., Seattle, WA (US); Michael A. Shaver, Renton, WA (US); Kevin R. MacKenzie, Bellevue, WA (US); Arun Ponniah Sethuramalingam, Seattle, WA (US); Jun Zhao, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1561 days.

(21) Appl. No.: 12/622,197

(22) Filed: Nov. 19, 2009

Related U.S. Application Data

(60) Provisional application No. 61/233,755, filed on Aug. 13, 2009.

(51) Int. Cl.
G06Q 10/00 (2012.01)
G06Q 10/06 (2012.01)

(52) U.S. Cl.
CPC ... G06Q 10/0631 (2013.01); G06Q 10/06311 (2013.01)

(58) Field of Classification Search
None
See application file for complete search history.

(56) References Cited

U.S. PATENT DOCUMENTS 5,615,121 A * 3/1997 Babayev et al. ............. 705/7.22
5,721,770 A 2/1998 Kohler
(Continued)

FOREIGN PATENT DOCUMENTS

EP 000897159 * 2/1999 ............. G06F 17/50

OTHER PUBLICATIONS

Chan, Wah-Ho and Lu,Ming. Materials Handling System Simulation in Precast Viaduct Construction: Modeling, Analysis, and Implementation. Journal of Construction Engineering and Management. (Year: 2008).*

(Continued)

*Primary Examiner* — Stephanie Z Delich
(74) *Attorney, Agent, or Firm* — Robert C. Kowert; Kowert, Hood, Munyon, Rankin & Goetzel, P.C.

(57) ABSTRACT

Various embodiments of a system and method for labor allocation across distinct processes of a materials handling facility are described. Embodiments may include a computer system configured to generate a model of a materials handling facility. The model may indicate, for each of multiple distinct quantities of work processed via a respective materials handling process, a quantity of labor resources processing that quantity of work in accordance with the respective materials handling process. The computer system may evaluate the model to determine that one or more additional labor resources are needed to process a particular quantity of work in accordance with a particular materials handling process. The computer system may select a labor resource processing a different quantity of work in accordance with a different materials handling process and generate an instruction that directs that labor resource to process the particular quantity of work via the particular materials handling process.

24 Claims, 7 Drawing Sheets

(56) References Cited

U.S. PATENT DOCUMENTS

| | | | |
|---|---|---|---|
| 5,784,452 A | | 7/1998 | Carney |
| 5,903,641 A | * | 5/1999 | Tonisson .................. 379/265.12 |
| 6,310,951 B1 | * | 10/2001 | Wineberg et al. ....... 379/265.06 |
| 6,507,945 B1 | * | 1/2003 | Rust ..................... B01J 19/0046 700/1 |
| 7,774,243 B1 | | 8/2010 | Antony et al. |
| 7,990,994 B1 | * | 8/2011 | Yeh ..................... H04L 12/4641 370/431 |
| 7,991,505 B2 | | 8/2011 | Lert, Jr. et al. |
| 2001/0003831 A1 | * | 6/2001 | Boland ................. G06F 9/5016 709/226 |
| 2002/0107914 A1 | * | 8/2002 | Charisius et al. ............ 709/203 |
| 2004/0162811 A1 | * | 8/2004 | Wetzer et al. .................... 707/2 |
| 2004/0193473 A1 | * | 9/2004 | Robertson et al. ............... 705/9 |
| 2006/0136578 A1 | * | 6/2006 | Covell et al. ................. 709/223 |
| 2007/0061179 A1 | * | 3/2007 | Henderson et al. ............. 705/8 |
| 2007/0150846 A1 | * | 6/2007 | Furnish et al. .................. 716/8 |
| 2007/0198797 A1 | * | 8/2007 | Kavuri ................... G06F 3/061 711/165 |

OTHER PUBLICATIONS

Dempsey, Patrick and Mathiassen, Svend Erik. On the evolution of task-based analysis of manual materials handling and its applicability in contemporary ergonomics. Applied Ergonomics 37, pp. 33-43. (Year: 2006).*

List, Mirchandani, Turnquist and Zografos. Modeling and Analysis for Hazardous Materials Transportation: Risk Analysis, Routing/Scheduling and Facility Location. Transportation Science vol. 25, No. 2. (Year: 1991).*

* cited by examiner

SYSTEM AND METHOD FOR RESOURCE ALLOCATION ACROSS DISTINCT PROCESSES OF A MATERIALS HANDLING FACILITY

PRIORITY INFORMATION

This application claims benefit of priority to U.S. Provisional Patent Application No. 61/233,755 filed Aug. 13, 2009 which is hereby incorporated by reference herein in its entirety.

BACKGROUND

Various applications of the Internet, and of the web, involve marketplaces that provide goods and/or services for sale. For instance, consumers may visit a merchant's website to view and/or purchase goods and services offered for sale by the merchant (and/or third party merchants). Some network-based marketplaces (e.g., Internet- or web-based marketplaces) include large electronic catalogues of items offered for sale. Distributors that operate such marketplaces may store inventory of items in one or more facilities (e.g., warehouses, distributions centers, etc.). In some cases, distributors may operate an entire fulfillment network that includes multiple facilities spread across a large geographical area. Due in part to the vastness of such fulfillment networks, even small supply chain inefficiencies can be compounded to significantly impact the network as a whole. Such inefficiencies can adversely impact a fulfillment network's ability to maintain requisite inventory levels (e.g., to prevent stockout situations), which among other things can ultimately impact a customer's marketplace experience in a negative manner (e.g., a desired item may be out-of-stock or backordered).

Figure 1:
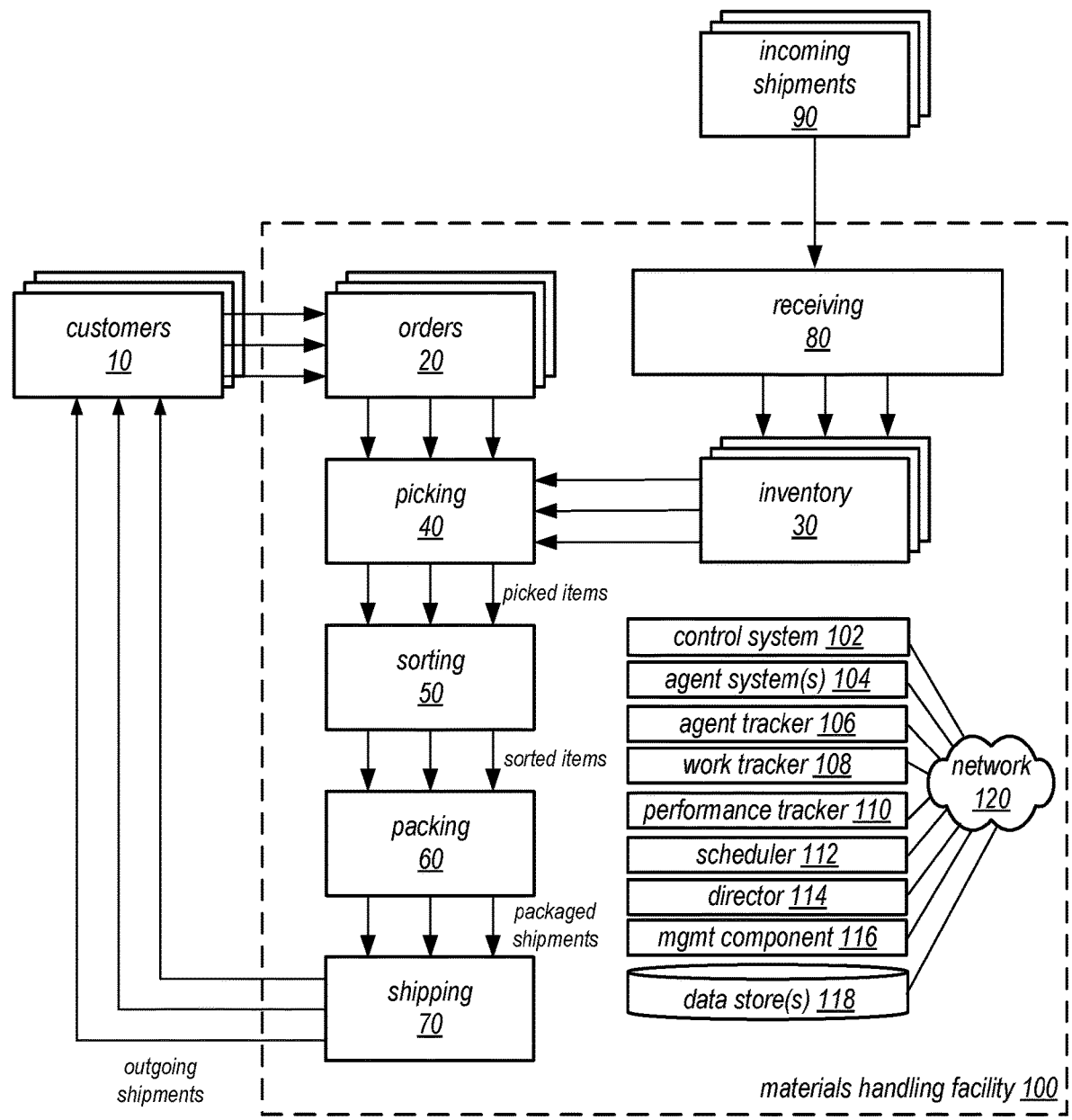
FIG. 1 illustrates a logical representation of a materials handling facility in the system and method for resource allocation across distinct processes of a materials handling facility, according to some embodiments.

While the system and method for resource allocation across distinct processes of a materials handling facility is described herein by way of example for several embodiments and illustrative drawings, those skilled in the art will recognize that the system and method for resource allocation across distinct processes of a materials handling facility is not limited to the embodiments or drawings described. It should be understood, that the drawings and detailed description thereto are not intended to limit the system and method for resource allocation across distinct processes of a materials handling facility to the particular form disclosed, but on the contrary, the intention is to cover all modifications, equivalents and alternatives falling within the spirit and scope of the system and method for labor allocation across distinct processes of a materials handling facility as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Introduction

Various embodiments of a system and method for resource allocation across distinct processes of a materials handling facility are described. Such embodiments may include a scheduler component (or simply "scheduler") configured to generate a model of a materials handling facility. In various embodiments, the model may indicate various quantities of work and associated locations of such quantities of work from a materials handling process perspective. For instance, the model may indicate that one or more quantities of work are undergoing a freight check-in process at the materials handling facility whereas one or more other quantities of work are undergoing a receiving process at the materials handling facility. Various other examples of materials handling processes in a materials handling facility are described in more detail below.

In addition to multiple quantities of work processed according to respective materials handling processes, the model of the materials handling facility may indicate the resources performing work on each quantity of work. In various embodiments, resources may include agents or automated agents (e.g., mechanized or robotic agents), or some combination thereof. In various embodiments described herein, the unit of measurement of an agent resource is primarily described in quantities of agents, although other units of measurement are possible and contemplated, such as agent-hours or another suitable metric for quantifying agent resources.

In various embodiments, the scheduler may be configured to evaluate the model to identify one or more quantities of work that need or require additional resources. For instance, in various embodiments, the scheduler may determine one or temporal requirements or goals on the processing of various quantities of work, such as a completion time or minimum processing rate. Based on such temporal requirements or goals, the scheduler may be configured to identify a quantity of work that (given the current quantity of resources servicing that quantity of work) will not meet such a temporal requirement or goal.

For a given quantity of work identified as needing or requiring additional resources, the scheduler component may be configured to select one or more resources (e.g., agents) from a pool of agents in the fulfillment center. The selection may be performed based on various criteria as described in more detail herein (e.g., context-switching times, agent capabilities or eligibilities, etc.).

In various embodiments, the scheduler may be configured to select resources such that resources are reallocated from one materials handling process to a different materials handling process at the materials handling facility. In this way, the scheduler may alleviate backlogs of work or other processing deficiencies for one materials handling process with resources from another materials handling process. In various embodiments, the aforesaid technique of reallocating resources from one materials handling process to a different materials handling process may alleviate momentary fluctuations in workload in a given materials handling process (which may sometimes be cause by batch-based workloads). In one example, a momentary fluctuation in workload may be caused by the receipt of a large, expedited shipment of units to be stored in inventory. In this example, such a fluctuation may cause a strain on inbound processes such as freight check-in and receiving (described in more detail below). By shifting resources from a less strained materials handling process downstream (e.g., resources from a stowing process, a packing process, a shipping process, or other materials handling process) to the freight check-in and/or receiving processes, various embodiments may provide a mechanism for coping with momentary fluctuations in workload by efficiently utilizing the existing agent resource force within the fulfillment center (e.g., without having to enlarge the overall quantity of resources within the fulfillment center). In other examples, embodiments may shift resources from a given materials handling process to a materials handling process downstream.

In some cases, the scheduler may reallocate resources by sending automated instructions to an agent or other resource (or by calling a service to send such instructions, as described in more detail below). In other cases, the scheduler may provide a manager an opportunity to review or override the work instructions generated by the scheduler or an opportunity to review a graphical representation of the model described above (e.g., on a computer display or a large display panel). This approach may in various embodiments preserve management's (or other supervising entity's) ability to override the results of the scheduler if need be.

As used herein, the phrase "quantity of work" may refer to any quantifiable amount of work within the materials handling facility. In some embodiments, the units in which a quantity of work is measured may be dependent upon which process the work is undergoing. For instance, in a freight check-in process (described in more detail below), quantities of work may be measured in pallets, such as the quantity of pallets on a delivery vehicle. In another example including a stowing process (described in more detail below), quantities of work may be measured in individual inventory units, cases of units, pallets of units, or some other defined group of units. In some cases, a quantity of work may be measured by the quantity of resources required to complete the work. For instance, in various embodiments, work may be measured in agent-hours or some variation thereof. In various embodiments, a quantity of work may be measured as a quantity of jobs at any of the work locations within materials handling facility 100. In various embodiments, a job may be a particular collection of one or more units categorized according to one or more characteristics. In some cases, a job may correspond to a set of one or more units grouped according to the manner in which such units are to be handled. For example, a singles or eaches job may include a single unit that may be handled separately from other units if need be. In another example, a case job may include a group of units (which may be homogenous or heterogeneous) that are grouped together in or on the same container (e.g., a case, bin, or other container). In another example, a pallet job may include a set of one or more units packed on the same pallet. In various embodiments, other units of measurement for quantifying work may be utilized, whether such units of measurement are presently known or developed in the future.

In various embodiments, the phrase materials handling process may include any process performed or carried out in a facility, such as to perform some level of work. A materials handling process may include a fulfillment process, such as an order fulfillment process, but is not limited such processes. In general, materials handling processes may include any process for moving, handling, and/or altering a quantity of work, whether such processes are currently known or developed in the future.

The Materials Handling Facility

FIG. 1 illustrates a logical representation or view of the operation of a materials handling facility 100 in which embodiments of the system and method for work location prioritization and resource assignment may be implemented. In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this Figure may illustrate an order fulfillment center of a product distributor, according to some embodiments. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 102). A picked, packed and shipped order does not necessarily include all of the items ordered by the customer; an outgoing shipment to a customer may include only a subset of the ordered items available to ship at one time from an inventory storage location.

A materials handling facility may also include a receiving 80 operation for receiving shipments of stock (e.g., units of inventory items) from one or more sources (e.g., vendors) and for placing the received stock into stock storage (e.g., inventory 30). The receiving 80 operation may also receive and process returned purchased or rented items or orders from customers. At least some of these items are typically returned to inventory 30. The various operations of a materials handling facility may be located in one building or facility, or alternatively may be spread or subdivided across two or more buildings or facilities. In various instances, it should be understood that references to elements, units, items, processes (or anything else) as being located within materials handling facility 100 may easily be extended to encompass elements, units, items, processes (or anything else) proximate to but not physically located within materials handling facility. For example, various elements, units, items, processes (or anything else) may be implemented outside of the materials handling facility if necessary.

As used herein, the term "item" may refer to a particular type of item and the term "unit" may refer to a particular instance of an item. For instance, an item might refer to a particular brand and model of a television, and multiple units of that same television might be stocked as inventory within a materials handling facility. Furthermore, as used herein, the term agent may refer to an agent or a machine agent (e.g., an automated or robotic agent). In some cases, some agents, which may be referred to as managers or management entities, may supervise the actions of other agents or give instructions to such agents.

FIG. 1 illustrates various elements (e.g., elements 102-120) as being implemented within materials handling facility. In some cases, some or all of these elements may operate remotely in another facility or location.

Control System and Agent Systems

Control system 102 may be configured to control some or all operations within materials handling facility 100. In some embodiments, control system 102 may also track the location of various quantities of work within the materials handling facility as well as the location of resources within the materials handling facility. As described in more detail herein, such information may be provided to other components (e.g., agent tracker 106 and work tracker 108), which may aggregate information on work (e.g., quantities of work, locations of work) and resources and provide such information via a service (a web- or network-based service) that may be queried by other components (e.g., scheduler 112). In this way, the scheduler may alleviate backlogs of work or other processing deficiencies for one materials handling process with resources from another materials handling process.

Figure 2:
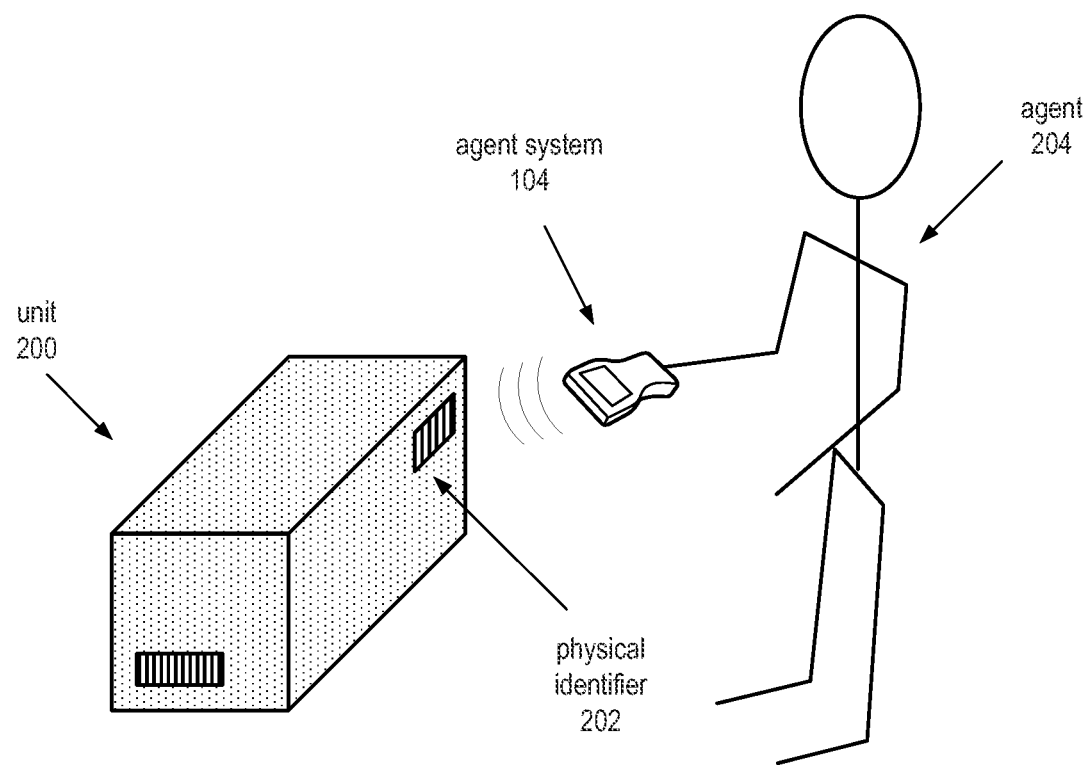
FIG. 2 illustrates an example of an agent system that may be utilized by a resource, according to some embodiments.

To track the location of resources and various quantities of work, control system 102 may in various embodiments be configured to communicate with one or more agents system(s) 104. For instance, agents (or other resources) may have access to an agent system(s) 104, such as a mobile or handheld computer system configured to receive and send messages (e.g., to and from control system 102) as well as other electronically identify units within the materials handling facility. One example of an agent system 104 is illustrated in FIG. 2. In the illustrated embodiment, an agent 204 may operate agent system 104 to electronically identify unit 200, which may represent a single unit, a group of units (e.g., a shrink-wrapped lot of units), or a container (or other conveyance element) of units. In the illustrated embodiment, unit 200 may include one or more physical identifiers 202, which may be electronically obtained by agent system 104 throughout various operations of the fulfillment center. Physical identifier 202 may represent any of a variety of identifiers including but not limited to barcodes (or other codes that may be read optically) and Radio Frequency Identifiers (RFID) tags. Agent system 104 may be configured to electronically obtain (e.g., scan or read) such identifiers. In other embodiments, other types of identifiers may be utilized, whether such units are presently known or developed in the future; likewise, agent system 104 may be configured to electronically obtain such identifiers.

In various embodiments, as agents move items from one location to another location within the materials handling facility, such movements may be recorded with an agent system(s) 104 utilized by the agent. For instance, to move an item from one location to another (e.g., from a receive dock to a location in inventory), an agent may perform a scan out process that includes scanning the particular location from which a unit is being taken and scanning the unit itself. Such scanning may include electronically obtaining an identifier for the location from which the unit is being taken and the unit itself. (In some cases, the location from which a unit is removed need not be scanned. Instead, the control system may determine or infer the location from which a unit is removed based on the unit's last known location as recorded by the control system.) For example, such scanning may include obtaining an identifier via an optical scanner (e.g., bar code scanner) or radio frequency identification (RFID) scanner. In response, the control system may generate a stored data record indicating the unit has left the corresponding location. A similar process may be performed when placing the unit at its new location. For example, an agent may scan an item and scan the location to which that item is being placed (e.g., a location in inventory 30 or some other location in the materials handling facility). In a similar manner as that described above, the control system may generate a stored data record indicating the unit has arrived at the new location. In this manner, control system 115 may in various embodiments track the location of a given unit throughout that unit's entire lifecycle in the materials handling facility (e.g., from receiving 80 to shipping 70). In some cases, the above-described tracking of units may be performed by an inventory management module, which may be a component of control system 115 or a separate component configured to communicate with control system 115.

In some cases, control system 115 may utilize automated devices or systems to track units within the materials handling facility. For instance, as units move from one location to another within the materials handling facility (e.g., on a conveyance mechanism), automated devices, such as optical or RFID scanners controlled by a computer system, may electronically obtain identifiers of units during such movement (e.g., by scanning an optical identifier or RFID tag). Such information may be collected by control system 115 in order to track units within the materials handling facility.

In various embodiments, agent system(s) 104 and control system 102 may communicate through one or more networks, such as network 120. Network 120 may include one or more local area networks (LANs) (e.g., Ethernet), Wide Area Networks (WANs) (e.g., the Internet), wireless networks, some other network configured to communicate information or data electronically, or some combination thereof. Additionally, any of the data or information described herein may be stored in one or more data stores, such as data store(s) 118. In various embodiments, data store 118 may be configured as a database, as one or more mass storage devices (e.g., physical disks, logical volumes, etc.) configured to store data blocks or files, or in any other suitable configuration for data storage.

The remaining elements of FIG. 1 including agent tracker 106, work tracker 108, performance tracker 110, scheduler 112, director 114, and management component 116, are described in more detail below with respect to FIG. 3.

Materials Handling Processes of the Materials Handling Facility

Figure 3:
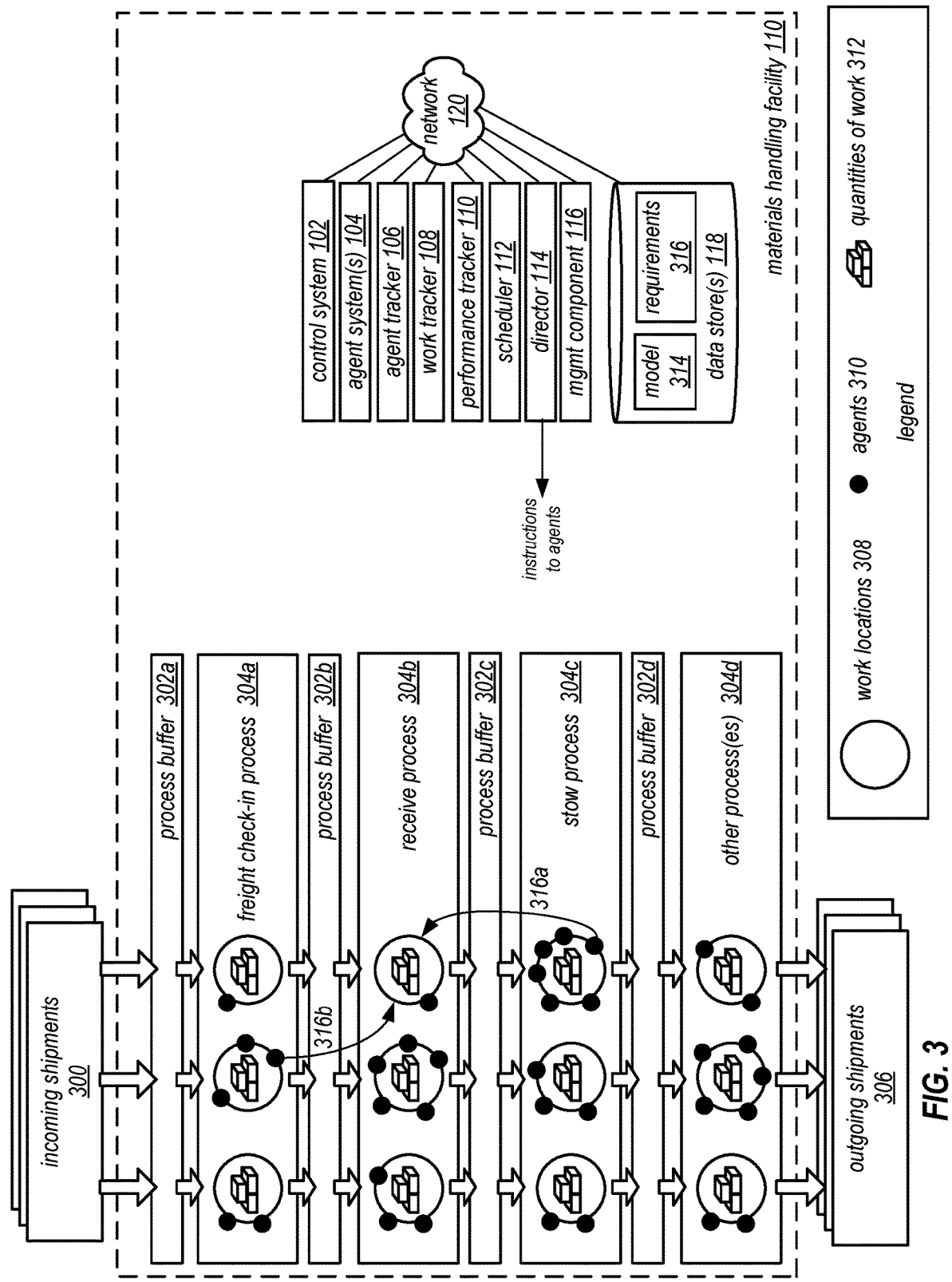
FIG. 3 illustrates a block diagram of the system components and various materials handling processes of the materials handling facility of various embodiments, according to some embodiments.

FIG. 3 illustrates one example of the various processes that are performed within materials handling facility 110 as well as elements 102-120, which are also illustrated in FIG. 1. As described in more detail, scheduler 112 (along with various service-oriented components) may in various generate a work model of the materials handling facility and, based on that model, identify one or more quantities of work to which additional resources should be assigned. In various embodiments, the scheduler may select particular resources (e.g., agents) to assign to such quantities of work from other fulfillment within the materials processing facility. In this way, the scheduler may alleviate backlogs of work or other processing deficiencies for one materials handling process with resources from another materials handling process. As described above, the aforesaid technique of reallocating resources from one materials handling process to a different materials handling process may alleviate momentary fluctuations in workload in a given materials handling process (e.g., by shifting resources from a less strained materials handling process to the given materials handling process).

In the illustrated embodiment, incoming shipments 300 may represent quantities of work entering materials handling facility 110. Such quantities of work may be processed according to various materials handling processes 304a-d (collectively referred to herein as processes 304) in order to create outgoing shipments 306. In the illustrated embodiments, incoming shipments 300 may be similar to incoming shipment 90 of FIG. 1. Likewise, outgoing shipments 306 may be similar to the outgoing shipments of FIG. 1.

In various embodiments, quantities of work may be processed in accordance with one materials handling process and subsequently passed to the next, as illustrated by the downward arrows of FIG. 3. From the standpoint of a given materials handling process, any materials handling process preceding the given materials handling process may be referred to as an upstream materials handling process and any materials handling process succeeding the given materials handling process may be referred to as a downstream materials handling process. As described above, quantities of work may take on different forms dependent upon the particular materials handling process that such quantities of work are undergoing. For instance, in a freight check-in process, quantities of work may be measured in pallets whereas in a shipment process, quantities of work may be measured in packaged shipments. In yet other cases (as described above), quantities of work may be measured in the resources that must be expended to process the work, such as agent-hours or some other similar measure of work.

In the various embodiments, the location of a quantity of work may be represented by a physical location within fulfillment center, such as any of work locations 308. Additionally (or alternatively), the location of a quantity of work may be represented by the materials handling process that is processing that quantity of work, such as any of processes 304.

In various embodiments, upon the completion of processing by one materials handling process, a quantity of work may proceed directly to the next process. In one example, quantities of work that have completed freight check-in process 304a may proceed directly to receive process 304b. In other cases, upon the completion of processing by one materials handling process, a quantity of work may proceed to a process buffer (one of process buffers 302a-d, collectively referred to as process buffers 302) prior to being processed by the next materials handling process for which the quantity of work is destined. In one example, quantities of work that have completed freight check-in process 304a may wait in process buffer 302b prior to being processed by receive process 304b. In various embodiments, process buffers 302 may be any location within the materials handling facility at which quantities of work may wait (or queue) prior to being processed by the next materials handling process. Embodiments of the system and method for resource allocation across distinct processes of a materials handling facility may minimize or eliminate the queuing of quantities of work within process buffers by balancing the flow of work between materials handling processes.

In various embodiments, various quantities of work 312 may be processed according to a variety of materials handling process, such as materials handling processes 304, which are described in more detail below. In one embodiment of freight check-in process 304a, one or more agents may remove quantities of work from a delivery vehicle (e.g., removing one or more pallets of items from a shipment carrier truck). In some cases, this process may include an agent signing for or otherwise acknowledging the receipt of such items. The freight check-in process may further include an agent moving a quantity of work to an entrance point (e.g., a dock door) of the materials handling facility. In various embodiments, materials handling process 304b may include a receiving process for receiving a quantity of work into the materials handling facility. This process may also include recording the receipt of quantities of work via an agent system, such as agent systems 104 described above, such that control system (or an inventory management module) may record the entrance of such items into the materials handling facility. In various embodiments, stow process 304c may include processing quantities of work by removing items from one or more work locations and placing such items in assigned locations within inventory of the materials handling facility. In various embodiments, other process(es) 304d may represent additional processes that may be performed within the materials handling facility. Examples of such processes may include any processes for completing the various operations illustrated in FIG. 1, including but not limited to processes for fulfilling the picking, sorting, packing, or shipping of units. Another example of a materials handling process includes a re-drop process where multiple received items are consolidated at different drop locations proximate to inventory 30. In some cases, the stowing process described above may source items from such drop locations. In some embodiments, such drop locations may serve as process buffer 302c of FIG. 3 (i.e., the process buffer preceding the stowing process). Other examples of materials handling processes include a replan process where units are moved from a lower priority inventory location to a relatively higher priority inventory location, a putback process where picked units are eventually returned to inventory 30 (e.g., due to a canceled order or shipment), and a transshipment process where items from other materials handling facilities bypass various processes and proceed directly to the stow process (or to the process buffer preceding the stow process). Note that various embodiments are not limited to the materials handling process described above. In general, any materials handling process that involves the movement, grouping, or alteration of units in the materials handling facility may be utilized in various embodiments, whether such materials handling process are currently known or developed in the future.

Generating a Model of the Materials Handling Facility

As described in more detail herein, scheduler 112 may be configured to generate a stored model (e.g., a state model) of the materials handling facility. In various embodiments, such model may indicate the various quantities of work within the fulfillment center (e.g., quantities of work 312) as well as the agents processing such quantities of work (e.g., agents 310). Such model may also indicate the materials handling processes (e.g., materials handling processes 304) by which the agents are processing such quantities of work. In various embodiments, the model may also indicate the work locations at which such quantities of work are located (e.g., work locations 308), such as physical locations within or proximate to the materials handling facility. In some embodiments, the model generated by scheduler 112 may be virtual (e.g., digital) representation of the operations of the materials handling facility that may be updated periodically, aperiodically, on-demand, or according to any other suitable timeline. In some cases, the model may provide a real-time or near real time representation of the materials handling facility. In various embodiments, the scheduler 112 may base resource allocation decisions upon an evaluation of the aforesaid model, as described in more detail herein.

In various embodiments, the scheduler 112 may utilize one or more network-based services to collect data upon which at least a portion of the aforesaid model is generated. For instance, such services may provide a network-accessible service interface that may be queried for information or data. (Although in some embodiments the scheduler may collect such information or data directly without querying network-based services.) Various components providing such services are described in more detail below.

Agent tracker 106 may be configured to track the location of work within the fulfillment center, either directly or via information obtained from control system 102. In various embodiments, such location information may be provided to scheduler 112 via a service interface provided by the agent tracker. For instance, the agent tracker may be configured to respond to scheduler queries via such interface, such as queries for the location of a particular agent, queries for all the agents located at a particular work location, queries for all the agents currently working within the domain of a given materials handling process, or some similar query. Scheduler 112 may query the agent tracker 106 at any time to obtain information on the location of agents, such as on a periodic, aperiodic or on-demand basis.

In various embodiments, agent tracker 106 may be configured to track the locations of agents (e.g., agents 310) within the materials handling facility or obtain data indicating the whereabouts of such agents from control system 102. In some embodiments, agents may service a work location using a conveyance vehicle (e.g., a manual or motorized cart) on which items are placed and removed from the work location. For instance, when an agent removes an item from a work location, the agent may scan (e.g., electronically identify) the item and scan the work location (see e.g., the scan out process described above). In addition to scanning the item and the work location from which the item was removed, the agent may also scan the vehicle on which the item is to be transported. Accordingly, control system 102 may record the location of that cart as being the last location scanned for that cart, which in this case would be the work location from which an item was just picked up. In this example, the agent may take the items to another location within the fulfillment center. The agent may then scan the item again, scan the vehicle from which the item is being removed, and scan the bin or stock location into which that item is being moved. The control system may also record this series of events. In this example, the vehicles new location as recorded by the control system would be the inventory bin scanned by the agent.

As describe above, the control system may track the location of an agent's conveyance vehicle. The control system may in various embodiments infer an agent's location from the location of that agent's conveyance vehicle. For instance, an agent may perform a checkout process for checking out a conveyance vehicle (e.g., at the start of a work shift). The control system may generate a stored association of the agent and his conveyance vehicle. Accordingly, to determine an agent's location, the control system may lookup that agent's associated conveyance vehicle, determine the location of that vehicle from stored records, and determine that agent's location as being the same as the most recent location of the associated conveyance vehicle.

In other embodiments, the location of agents may be directly monitored instead of inferred from the location of conveyance vehicles. For instance, agents may in some cases periodically report their locations to control system 102. In other cases, an agent may wear a device that tracks his location and automatically reports the location to control system 102 in real-time or near-real-time. Also note that any of the functionality of control system 115 (e.g., tracking agents, or other functionality) may be implemented as part of agent tracker 106 in some embodiments. In some embodiments, agent tracker may query the control system or another system for such information (e.g., the location of agents).

In various embodiments, work tracker 108 may be configured to track the locations of various quantities of work (e.g., quantities of work 312) within the materials handling facility or obtain data indicating the whereabouts of such quantities of work from control system 102. In various embodiments, such location information may be provided to scheduler 112 via a service interface provided by the work tracker. For instance, work tracker 108 may be configured to respond to scheduler queries via such interface, such as queries for the location of a particular quantity of work, queries for all the quantities of work located at a particular work location, queries for all the quantities of work currently undergoing a given materials handling process, or some similar query. Scheduler 112 may query the work tracker at any time to obtain information on the location of quantities of work, such as on a periodic, aperiodic or on-demand basis.

In some embodiments, as quantities of work are moved through various materials handling processes and moved on to subsequent materials handling processes, agent systems 104 and control system 102 may work in conjunction to track the location of such quantities of work. For instance, as described above, agent systems 104 and control system 102 may be configured to track the location of various units of items throughout the fulfillment center. Since a given quantity of work may in various embodiments consist of one or more units, the location of a quantity of work may be inferred from the constituent items that make up that quantity of work. In other cases, a quantity of work may be directly determined according to the techniques described above. For instance, a container of multiple items (e.g., a pallet of items) may have a physical identifier (e.g., a barcode) affixed somewhere on the container; such identifier may identify that container as particular quantity of work. Any of the aforesaid information may be obtained by work tracker 108 and provided to scheduler 112 via a network-based service interface of the agent tracker.

In various embodiments, performance tracker 110 may be configured to track the performance of the materials handling processes within the materials handling facility. In various embodiments, such performance information may be provided to scheduler 112 via a service interface provided by the performance tracker. For instance, performance tracker 110 may be configured to respond to scheduler queries via such interface, such as queries for processing rates of various materials handling processes (e.g., a processing rate in terms of quantity of overall work processed by the materials handling process per unit of time) and/or processing rates for a particular quantity of work undergoing a particular process (e.g., a processing rate in terms of a portion of that quantity of work processed by that particular process per unit of time). The performance tracker may also track the historical performance of individual agents or a group of agents in the aggregate. For instance, for a particular process, the performance tracker may determine the processing rate at which one or more agents perform work, which may be expressed in a quantity of work per unit time. For example, for a stowing process, the performance tracker may be configured to determine that a particular agent's historical processing rate is 20 cases per hour. In another example, the performance tracker may be configured to determine an average historical processing rate based on the performance of multiple agents. For instance, the performance tracker may determine that historically agents in general average 18 packages per hour per agent in a packing process.

In various embodiments, the performance tracker may be configured to determine the various processing rates described above based on information from control system 102 and/or agent system(s) 104. For instance, control system 102 in conjunction with agent system(s) 104 may record the initiation and/or completion of work within the materials handling facility (e.g., the movement of units from one location to another location, the picking of units, the sorting of units, the packing of units, etc.). As is the case with other services provided by components described above, performance tracker 110 may be queried by scheduler 112 at any time such that scheduler 112 obtains information on processing rates of various materials handling processes, processing rates for a particular quantity of work undergoing a particular process, and/or processing rates of individual agents or agents in the aggregate.

As described above, scheduler 112 may be configured to generate a stored model 314, which may indicate the various quantities of work 312 within the materials handling facility. For each quantity of work 312, the model may also indicate the current process 304 according to which that quantity of work is being processed as well as the agents currently working to process that quantity of work in accordance with the current process. In various embodiments, the model may also indicate, for each quantity of work, the actual or estimated processing rate (e.g., quantity of work per unit time) with which that quantity of work is being processed. In one embodiment, the model generated by scheduler 112 may be a stored representation of the elements of FIG. 3 (e.g., elements 300-306).

In various embodiments, scheduler 112 may generate the model of the materials handling facility described herein based on information obtained from agent tracker 106, work tracker 108, and/or performance tracker 110. For instance, as described above, the aforesaid elements may provide service interfaces that may be queried by scheduler 112 for information or data. Scheduler 112 may query the respective service interfaces to determine the various quantities of work 312 within the materials handling facility, the respective process 304 according to which each quantity of work is being processed, the agents currently working to process a given quantity of work in accordance with the respective process, and/or the actual or estimated processing rate for each quantity of work.

Figure 4:
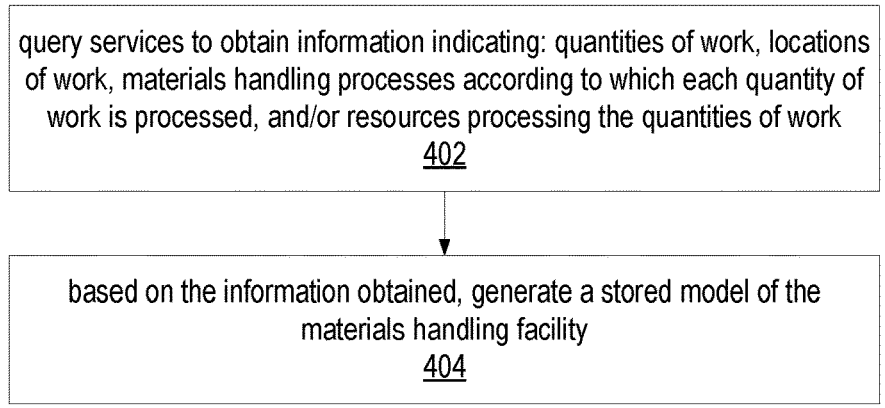
FIG. 4 illustrates a flowchart of an example method for generating a model of a materials handling facility, according to some embodiments.

Various methods may be performed by the system and method for resource allocation across distinct processes of a materials handling facility. FIG. 4 illustrates an example of such a method. In various embodiments, the method of FIG. 4 may be performed by scheduler 112 described herein. As illustrated by block 402, the method may include querying one or more services to obtain information indication one or more of: quantities of work, locations of work, materials handling processes according to which each quantity of work is processed, and/or the resources processing each quantity of work. For instance, performing block 402 may include querying any of the service interfaces described above to determine the aforesaid information, including but not limited to querying an agent tracker 106, work tracker 108, and/or a performance tracker 110. As illustrated by block 404, the method may also include, based on the information obtained, generating a stored model of the materials handling facility. One example of generating a stored model may include using the techniques described above for generating model 314. In various embodiments, such a model may be a stored representation of materials handling processes, quantity of work undergoing such process, resources (e.g., agents) processing such quantities of work, and/or work locations (e.g., physical locations) of the materials handling facility at which the respective quantities of work are located (e.g., a receiving dock, an area in inventory, a packing station, a sorting station, etc.).

Evaluating the Model of the Materials Handling Facility

Returning to FIG. 3, scheduler 112 may be configured to evaluate the generated model to identify one or more quantities of work 312 for which additional resources (e.g., agents) are needed, for example, to meet one or more processing requirements (e.g., a minimum processing rate) or to meet a requirement that specifies a time or date by which the processing of a quantity of work is expected to be completed (which may be referred to herein as a temporal indication of when the processing of that quantity of work is expected to be completed). In some embodiments, such requirement may be configurable (e.g., by a management entity) and/or determined from one or more other portions of information including but not limited to service level agreements (SLAs), operational level agreements (OLAs), or some other information. Cycle time (describe below) is another example of a temporal indication of when the processing of a quantity of work is expected to be completed. Any of the temporal indications of when the processing of a given quantity of work is expected to be completed may be stored in a data store as requirements to be evaluated by the scheduler component, such as requirements 316 of data store 118.

In various embodiments, the scheduler may, for a given quantity of work at a work location, determine a quantity of resources (e.g., agents) needed to process that quantity of work (according to that quantity of work's current materials handling process) as indicated by the materials handling facility model. In various embodiments, this determination may be based on historical data, such as an observed measure of the quantity of work an agent may process in a given time period including but not limited to the processing rates determined by the performance tracker described above. In some cases, this data may be based on the particular type of work being processed. For instance, the aforesaid historical data may indicate that agents historically process 30 cases per hour or 10 pallets per hour. In some cases, the historical data may indicate a rate at which a particular agent processes jobs. In some cases, the historical data may indicate an aggregate historical rate at which a group of multiple agents processes jobs. In yet other cases, an average or mean process rate may be determined for individual agents based on the performance of multiple agents or even all agents.

In various embodiments, the determination of the quantity of resources (e.g., agents) needed to service a quantity of work may also be based on a cycle time. Cycle time (which may be configurable) may indicate a period of time by which a given quantity of work is expected to be fully processed. In one example, a cycle time of 30 minutes may indicate that all items at work location at a particular time should be processed and removed from the work location by 30 minutes after that particular time.

By way of example, if i) a work location includes 9 pallet jobs, ii) pallet jobs are historically processed at 6 pallets per hour per agent, and iii) the configured cycle time is 30 minutes (0.5 hours), then the quantity of agents needed to process the jobs of that work location may be 3 (e.g., 9 pallet jobs divided by the product of 6 pallets per hour per agent and the cycle time of 0.5 hours).

A generalized formula, which may be utilized by scheduler 112 for determining resources needed for a given quantity of work, is illustrated by equation 1 below.

$$\text{labor needed} = \text{ceiling}\left[\frac{\text{quantity of work}}{(\text{historical process rate per agent})(\text{cycle time})}\right] \quad (1)$$

In equation 1, quantity of work may represent the quantity of work being evaluated; the unit of measurement for this value may be a quantity of units of items (e.g., 9 units) or expressed in quantity of jobs (e.g., 9 pallet jobs) or any other unit of measurement for work described above. Furthermore, historical process rate per agent may be expressed in a quantity of units processed per time period per agent (e.g., 6 units per hour per agent) or a quantity of jobs processed per time period per agent (e.g., 6 pallet jobs per hour per agent); these values may be observed values determined from historical data (such as provided by performance tracker 110). Additionally, cycle time may be expressed as any period of time (e.g., 0.5 hours). The function ceiling may round the bracketed value up to the next integer if and only if such value is not already an integer. If the bracketed value is already an integer, ceiling does not change the value. For instance, if the bracketed value were calculated to be 3.4 agents, the ceiling function would round that value to 4 agents since agents can only be expressed in integer values. If the bracketed value were calculated to be 3 agents, the ceiling function would leave such value at 3 agents. In some embodiments, a floor function may be utilized instead of the ceiling function; such a floor function may round down a non-integer value. For instance, in the example of 3.4 agents given above, the floor function would return 3 agents (instead of 4, as would be returned by a ceiling function). In some cases, the floor function may be utilized to provide a more conservative approach to reassigning agents.

Figure 5:
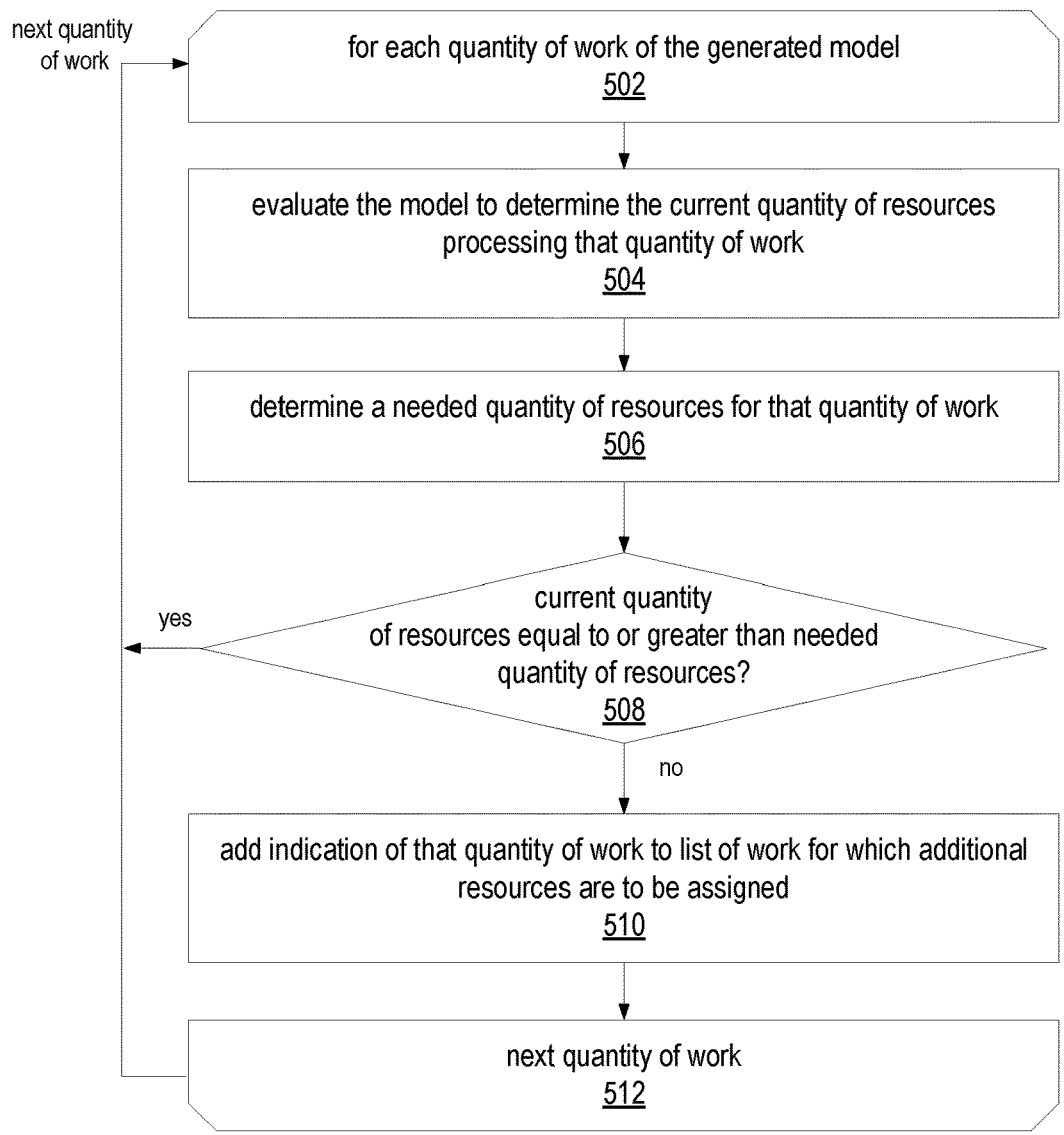
FIG. 5 illustrates a flowchart of an example method for evaluating a model of a materials handling facility, according to some embodiments.

Scheduler 112 may in various embodiments utilize the techniques for determining the quantity of resources needed in order to evaluate the model of the materials handling facility. In one example, FIG. 5 illustrates a flowchart of a method for evaluating the model to identify one or more quantities of work for which additional resources are needed. In various embodiments, scheduler 112 may be configured to perform the method of FIG. 5 in order to evaluate the model of the materials handling facility. As illustrated by blocks 502 and 512, the method may be performed for each quantity of work indicated by the generated model of the materials handling facility. As illustrated by block 504, the method may include determining the current quantity of resources processing the quantity of work. For instance, for a particular quantity of work, the model may indicate that a particular number of agents 310 are processing that quantity of work. The method may also include determining a needed quantity of resources for that quantity of work (block 506). For instance, in some embodiments, the method may include calculating the quantity of agents needed for that quantity of work in accordance with equation 1 described above.

As illustrated by block 508, the method may include determining whether the current quantity of resources (as determined according to block 504) is equal to or greater than the needed quantity of resources (as determined according to block 506). If so, the method may proceed to the next quantity of work in the model of the materials handling facility, as indicated by the positive output of block 508. If not, the method may add an indication of that quantity of work (e.g., an identifier of the quantity of work) to a list of work for which additional resources are to be assigned. In various embodiments, the list of work for which additional resources are to be assigned may be stored within a data store, such as data store 118.

Allocation and Work Instructions

Figure 6:
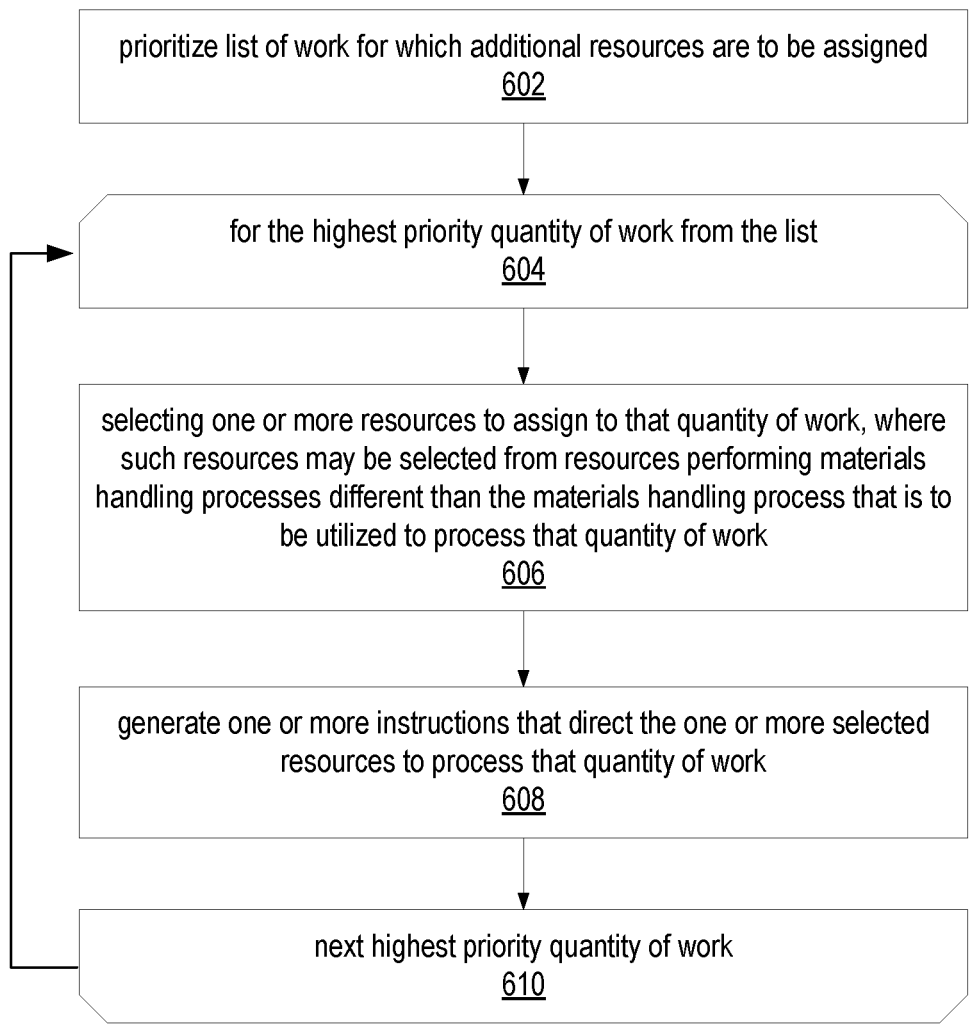
FIG. 6 illustrates a flowchart of an example method for selecting resources and sending work instructions to such resources, according to some embodiments.

In various embodiments, the result of the method of FIG. 5 may be a list of multiple quantities of work for which additional resources are needed. FIG. 6 illustrates an example method for processing such a list in order to generate instructions to send resources to process quantities of work requiring additional resources. In various embodiments, the method of FIG. 6 may be performed by scheduler 112. In various embodiments, the input to the illustrated method may be a list of candidate quantities of work for which additional resources are needed, such as a list generated according to the example method of FIG. 5.

As illustrated by block 602, the method may include prioritizing the list of work for which additional resources are to be assigned. In various embodiments, this may include prioritizing different quantities of work according to one or more prioritization criteria including but not limited to customer demand for units of the quantity of work (e.g., whether or not units of the quantity of work are designated as having a high turnover rate relative to other items in the materials handling facility), inventory levels for items of the quantity of work (e.g., units corresponding to items with low inventory may need to be expedited into inventory during a stow process), a priority shipping designation for the quantity of work (e.g., units designated as having an expedited shipping status may need to be packaged and shipped before other units), the number of units or jobs making up a particular quantity of work (e.g., the more unprocessed units/jobs making up a given quantity of work, the higher the chance of creating a process bottleneck), or some other prioritization criteria associated with the fulfillment of work.

As illustrated by block 604-610, blocks 606 and 608 may be repeated to process multiple quantities of work of the prioritized list. As illustrated by block 606, the method may include selecting one or more resources to assign to the quantity of work being evaluated. In some cases, agents (or other resources) may be selected from a pool of available agents (e.g., agents unassigned to any other materials handling process). However, in some embodiments, agents currently performing another materials handling process within the materials handling facility may be selected (e.g., reallocated) to process the particular quantity of work (as determined in block 204) in accordance with whatever process that quantity of work is currently undergoing (e.g., a particular one of materials handling processes 304). As indicated by block 606, note that the materials handling process an agent (or other resource) is performing when selected for reallocation to the particular quantity of work may be different than the materials handling process to be utilized to process the particular quantity of work. For example, for a particular quantity of work undergoing a receiving process, the agent selected for reallocation to that quantity of work may be performing (or designated as performing) a packing process on another quantity of work when selected for reallocation. In this way, the illustrated method may be utilized (e.g., by scheduler 112) to reallocate resources across different materials handling processes within the materials handling facility. As described above, the aforesaid technique of reallocating resources from one materials handling process to a different materials handling process may alleviate momentary fluctuations in workload in a given materials handling process.

In various embodiments, the method may include enforcing one or more constraints on the selection of a particular agent. For instance, different agents may have different eligibilities or capabilities. For instance, in various embodiments, the method may include receiving information that specifies, for each agent of multiple agents (or other resources), the job eligibility status for that agent. In various embodiments, a given agent's job eligibility status may indicate that he is eligible to perform one or more particular types of jobs or materials handling processes. For instance, one agent may be eligible to operate a vehicle for processing pallet jobs whereas another agent may be eligible to process singles and case jobs, but not jobs that require the use of a vehicle for transporting units. In general, any combination of job types may be utilized to express a given agent's job eligibility. In some embodiments, some agents may be eligible to process high value jobs (e.g., jobs that include very expensive or rare units) whereas others may not be eligible to process such jobs. In one example, only agents that have successfully completed an authorization process (e.g., a background check or other authorization process) may be eligible to process certain types of jobs (e.g., high-value jobs).

In various embodiments, the method may include enforcing positive biases on the selection of an agent. For instance, in one example, an agent that has been performing work under the same process for more than a specified period of time (e.g., 2 hours or another time period) may be favored to be selected in accordance with block 606. In one example, such a positive bias may be enforced to reduce stress caused by performing the same function for an extended period of time. In some embodiments, a recommended or actual limit on the period of time a given agent is permitted to perform work according to a particular materials handling process may be indicated by one or more safety constraints (which may be configurable). Various embodiments may be configured to enforce such constraints on the selection of an agent. In various embodiments, enforcing such safety constraints may reduce agent fatigue, preserve agent alertness, and decrease the overall risk of accidents within the materials handling facility. In another example, one agent may be favored over another agent dependent upon a quantity of pending work assigned to each agent. For instance, if one agent at another materials handling process is almost done with his work, he may be favored over another agent that has a comparatively large amount of pending work to perform.

In various embodiments, the method may include tracking context-switching time, which may include the quantity of time required for resources to stop performing work in one materials handling process and start performing work in a new materials handling process. In various embodiments, content-switching times may be collected for any of the possible pairs of materials handling processes within the materials handling facility. In various embodiments, the method may include prioritizing the selection of agents (or other resources) based on the context-switching time for the materials handling process that the agent would be leaving and the materials handling process to which the agent would be beginning. For instance, agents having relatively small context-switching times may be favored over those with relatively large context-switching times. In one example, the context-switching time associated with moving between a shipping process and a receiving process may be larger than the context-switching time associated with moving between a stowing process and a receiving process. Note that this is just one example; actual context-switching times may be dependent on the observed operations of the materials handling facility. In various embodiments, scheduler 112 may monitor the above-described context-switching metric for various pairs of materials handling processes. Also note that in some embodiments use of context-switching times in the aforesaid analysis may obviate the need for having knowledge of the physical layout of the materials handling facility. For instance, by virtue of including the travel time from one process to another process, context-switching times may sufficiently account for various travel times caused by different physical paths between materials handling processes within the fulfillment center.

In some embodiments, one or more capacity constraints of processes and/or work locations of the materials handling facility may affect the selection of agents. In various embodiments, a given capacity constraint may indicates a maximum quantity of resources permitted at a particular work location. For instance, in some cases, a given process or a given work location may only be able to support a particular number of agents (e.g., overcrowding of agents at an item sorting station may cause output of that station to fall below maximum output). Accordingly, in some embodiments, if the work location at which a particular quantity of work is already saturated with resources, the method may include withholding instructions to assign additional resources to such location. In one particular example, receive lanes (e.g., distinct areas of the materials handling facility at which items are received) may each support only one agent at a given time (e.g., to prevent overcrowding or for other reasons). In general, a capacity constraint may include any limitation on the quantity of resources (e.g., agents or any other resource) permitted at various locations within materials handling facility or at various processes of the materials handling facility.

As illustrated by block 608, the method may include generating one or more instructions that direct one or more of the selected resources to process that quantity of work. For instance, as described above, agents may carry or have access to agent system(s) 104. Accordingly, in various embodiments, the method may include identifying an agent's agent system 104 and sending a work instruction that indicates one or more of a quantity of work to process, a location of the quantity of work, and a materials handling process (e.g., freight check-in, receiving, stowing, picking, packing, etc.) according to which the quantity of work is to be processed. In various embodiments, this may include sending a message to the agent's system 104 such that a graphical version of the aforesaid work instruction is generated on a display of the agent system such that it can be viewed by the appropriate agent.

In various embodiments, such as when the method is implemented by scheduler 112, the method may include calling director 114 of FIG. 3. In various embodiments, the director may be configured to provide a service interface for receiving instructions from scheduler 112. In response to a call from scheduler 112, director 114 may be configured to generate work location instructions, which may be provided to agents of the materials handling facility. For example, in some embodiments, each agent may carry or have access to an agent system 104. Each agent system may include a user interface display, upon which such work location instructions may be displayed. In various embodiments, the user interface display of the agent system may include a graphical representation of a work instruction that indicates one or more of a quantity of work to process, a location of the quantity of work, and a materials handling process according to which the quantity of work is to be processed. In some embodiments, such messages may be "pushed" to agents within the materials handling facility (e.g., sent to agents without such agents requesting the messages). In other cases, such messages may be sent (e.g., wirelessly transmitted) to an agent system(s) 104 in response to the agent submitting a request for work instructions. For example, an agent may submit such a request for a new work location after completing all work at another work location. Examples of agents moving from one work location to a new work location (in response to the work instructions described herein) are illustrated by the movement of agent 316a and the movement of agent 316b.

In addition to sending work instructions to agent systems, director may be configured to wait for an agent to finish his current task, log them out of a process tool (e.g., a software application that assists the agent with his duties) for their current materials handling process, and log them into a different tool for the new materials handling process to which the agent is assigned.

In various embodiments, scheduler component 112 may be configured to determine that an agent has not adhered to a work instruction that has been assigned to him. For instance, in various embodiments, work instructions may be considered to be expired if not fulfilled by an agent within a particular period of time; scheduler component 112 may be configured to monitor the status of any issued work instruction to ensure that expired work instructions are reissued. In various embodiments, to reissue a work instruction, scheduler 112 may be configured to update model 314 and generate a new work instruction based on the updated model.

Returning to FIG. 3, various embodiments may also include a management component 116. Management component 116 may provide a manager an opportunity to review or override the work instructions generated by the scheduler or an opportunity to review a graphical representation of the model described above (e.g., on a computer display or a large display panel). This approach may in various embodiments preserve management's (or other supervising entity's) ability to override the results of the scheduler if need be. In various embodiments, management component 116 may generate a graphical representation of the materials handling facility model for review by a manager and/or agents such that resources have greater visibility into the distribution of pending quantities of work within the materials handling facility.

In various embodiments, scheduler 112 may be configured to perform workload forecasting based on the model of the materials handling facility described above. For instance, in various embodiments, the scheduler may track the movement of various quantities of work between processes of the facility over time. In some cases, the scheduler may perform a statistical analysis on such data to determine the likelihood and to what extent a given backlog of work in one materials handling process will affect a downstream materials handling process. Additionally, scheduler 112 may perform a statistical analysis on historical data of incoming quantities of work (e.g., incoming shipments) to generate forecasts of the quantity of work that will arrive at the materials handling facility on a given day. In some cases, the scheduler may also receive advanced ship notifications (ASNs) (which may specify a date/time at which a given quantity of work is to arrive at the materials handling facility) and generate the aforesaid forecasts based on such ASNs. In some embodiments, the scheduler may be configured to, based on such forecasts, generate one or more instructions to preemptively allocate resources, such as before the beginning of workday or work-shift.

Example Computer System

Various embodiments of a system and method for resource allocation across distinct processes of a materials handling facility, as described herein, may be executed on one or more computer systems, which may interact with various other devices. Note that any component, action, or functionality described above with respect to FIGS. 1-6 may be implemented via one or more computer systems configured as computer system 900 of FIG. 7, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions 922 and/or data 932 accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 implementing scheduler 112 (configured as described above) and data store 118 (as described above) are shown stored within system memory 920. Additionally, data 932 of memory 920 may store any of the data structures described above, in some embodiments. In some embodiments, program instructions and/or data may be received, sent or stored upon different types of computer-accessible media or on similar media separate from system memory 920 or computer system 900. While computer system 900 is illustrated as implementing scheduler 112, any of the components illustrated above with respect to FIG. 3, (e.g., the control system, agent systems, agent tracker, work tracker, performance tracker, director, management component, etc.) may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices (e.g., any other component of FIG. 3, as described above) attached to a network 985 (which may be similar to or the same as network 120 described above) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Figure 7:
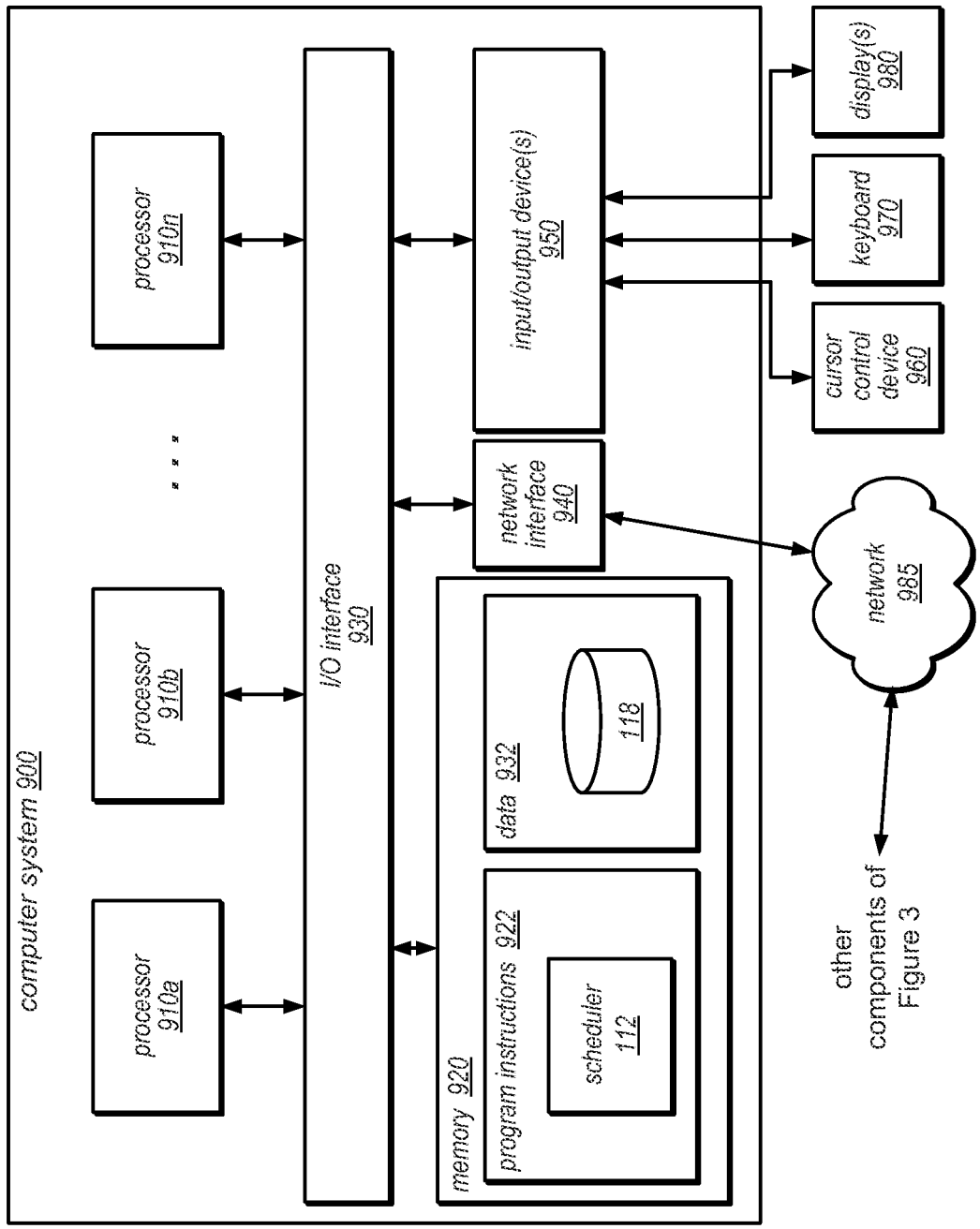
FIG. 7 illustrates a computer system suitable for implementing various elements of the system and method for resource allocation across distinct processes of a materials handling facility, according to some embodiments.

As shown in FIG. 7, memory 920 may include program instructions 922 configured to implement any element or action described above, such as scheduler 112. In one embodiment, the program instructions may implement the methods described above, such as the method illustrated by FIGS. 4, 5 and 6. In other embodiments, different elements and data may be included. Note that data 932 may include any data described above with respect to FIGS. 1-6.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

System Configuration Example

Figure 8:
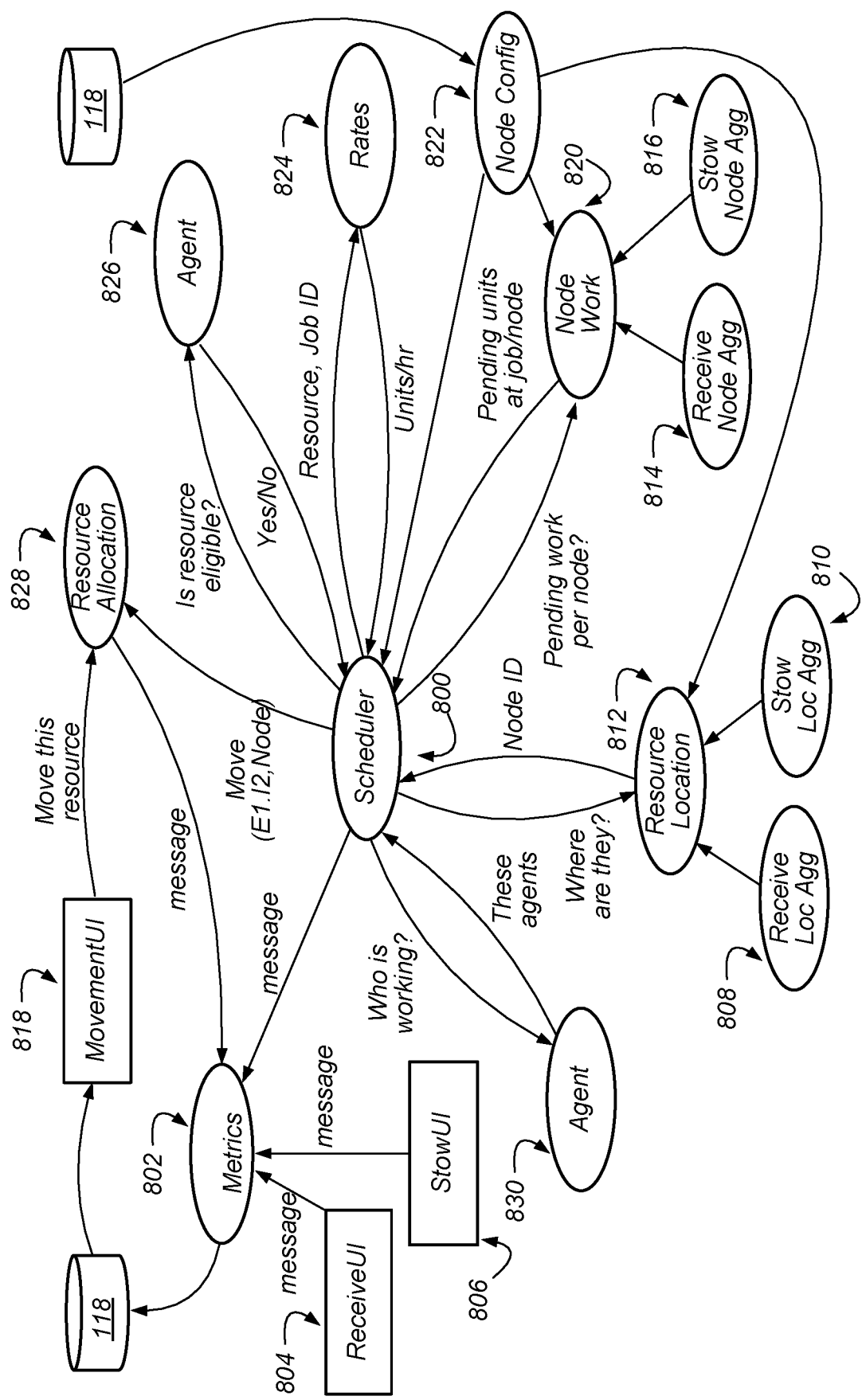
FIG. 8 illustrates one example of a system configuration suitable for implementing various elements of the system and method for resource allocation across distinct processes of a materials handling facility, according to some embodiments.

FIG. 8 illustrates one example of a system configuration including various components configured to implement features of the system and method for resource allocation across distinct processes of a materials handling facility. In some embodiments, the illustrated elements of FIG. 8 may be but need not be implemented according to a service oriented architecture. In various embodiments, scheduler component 800 may be configured to implement any of the functionality of scheduler 112 described above. In various embodiments, scheduler 800 may be configured to determine a current list agents working (e.g., overall in the materials handling facility, or at a particular location in the materials handling facility) by querying service 830. In various embodiments, scheduler 800 may be configured to determine where such agents are by querying service 812, which may receive location information from services 808-810. Service 812 may respond to scheduler 800 with a node ID. In various embodiments, the node ID may correspond to a resource location within the materials handling facility. In various embodiments, the model of the materials handling facility may have multiple nodes, each identified by a node ID; each node may correspond to a particular location of the materials handling facility. In various embodiments, service 812 may be configured to implement the functionality of agent tracker 106 described above.

In various embodiments, scheduler 800 may also be configured to query service 820 for information regarding the quantities of work (e.g., jobs) at one or more work locations (e.g., nodes). Service 820 may generate a response based on information from elements 814 and 816 as well as a node configuration illustrated as element 822. In various embodiments, service 820 may be configured to implement the functionality of work tracker 108 described above. In various embodiments, the scheduler 800 may be configured to obtain performance information for a particular resource (e.g., agent or employee) by querying service 824, which may be configured to implement the functionality of performance tracker 110 described above. In various embodiments, scheduler 800 may be configured to query service 826 for resource eligibility and/or capabilities. Service 826 may be configured to provide any of the resource eligibility and/or capability information described above.

In various embodiments, based on all of the above described information queried from various services as described above, scheduler 800 may be configured to issue a work instruction to resource allocation service 828, which may be configured to implement the functionality of director 114 described above. In one example, resource allocation service 828 may, based on the instruction from the scheduler, send an instruction to move a particular agent from one materials handling process to a different materials handling process within the fulfillment center. In some cases, such instruction may be sent to an agent system 104 (e.g., a mobile hand-held device). In addition to sending work instructions to agent systems, service 828 may be configured to wait for an agent to finish his current task, log them out of a process tool (e.g., a software application that assists the agent with his duties) for their current materials handling process, and log them into a different tool for the new materials handling process to which the agent is assigned. In some cases, an instruction for the agent to move from one location or process to another location or process may be presented in between the logging out of one tool and the logging in of the new tool. Various embodiments may also include multiple user interfaces and data stores (e.g., one or more data stores 118). For instance, in some embodiments, a service 802 configured to generate and/or maintain resource metrics on various resources may receive messages from user interfaces (UIs) 804 and 806. In some embodiments, movement UI 818 may be configured to receive instructions (e.g., instructions from managers) to move a resource from one materials handling process to another. In various embodiments, movement UI 818 may implement some or all of the functionality of management component 116 described above.

What is claimed is:

1. A computer-implemented method, comprising:
   performing, by one or more hardware processors of one or more computers:
   storing a model of a materials handling facility in a data store, the model indicating, for each of a plurality of distinct quantities of work undergoing a respective materials handling process of a plurality of distinct materials handling processes: a quantity of agent resources actively processing each quantity of work in accordance with the respective materials handling process;
   updating, by a scheduler component, the model of the materials handling facility;
   evaluating, by the scheduler component, the updated model to determine that one or more additional agent resources are needed to process a particular quantity of work in accordance with a particular materials handling process;
   selecting, by the scheduler component, a robotic resource processing a different quantity of work undergoing a different materials handling process from the particular materials handling process, wherein the particular materials handling process is in a distinct location from the different materials handling process;
   generating an instruction that directs the selected robotic resource to process the particular quantity of work via the particular materials handling process such that the selected robotic resource is caused to move to the distinct location to process the particular quantity of work via the particular materials handling process instead of the different quantity of work undergoing the different materials handling process that the robotic resource is actively performing at the time of said selecting; and
   transmitting the instruction to the selected robotic resource such that the selected robotic resource is caused to move to the distinct location to process the particular quantity of work via the particular materials handling process instead of the different quantity of work undergoing the different materials handling process that the robotic resource is actively performing at the time of said selecting.

2. The computer-implemented method of claim 1, wherein the method comprises:
   determining a temporal indication of when the processing of the particular quantity of work is expected to be completed;

wherein evaluating the updated model to determine that the one or more additional agent resources are needed comprises: determining that the one or more additional agent resources are needed in order to meet a particular requirement, wherein the particular requirement is a requirement to complete the processing of the particular quantity of work in accordance with the particular materials handling process no later than a time specified by the temporal indication.

3. The computer-implemented method of claim 1, wherein said evaluating the updated model to determine that one or more additional agent resources are needed to process the particular quantity of work in accordance with the particular materials handling process comprises:
  determining that a quantity of agent resources currently processing the particular quantity of work is less than a needed quantity of agent resources for that particular quantity of work.

4. The computer-implemented method of claim 3, wherein the method comprises determining said needed quantity of agent resources based on: said particular quantity of work, a historical process rate of one or more agents, and a temporal indication of when the processing of the particular quantity of work is expected to be completed; wherein said historical process rate indicates a quantity of work performed per a particular unit of time.

5. The computer-implemented method of claim 1, further comprising sending the generated instruction to a mobile computer system associated with and accessible by the selected robotic resource.

6. The computer-implemented method of claim 1, wherein the particular resource selected is selected based at least in part on a context-switching time, wherein the context switching time indicates a historical measurement of a period of time required to stop performing said different materials handling process and start performing the particular materials handling process.

7. The computer-implemented method of claim 1, wherein the particular robotic resource selected is selected based at least in part on an eligibility status of the particular robotic resource, the eligibility status indicating one or more materials handling processes that the particular robotic resource is eligible to perform.

8. The computer-implemented method of claim 1, wherein said selecting a robotic resource is at least partially dependent on a capacity constraint that indicates a maximum quantity of agent resources permitted at a particular work location.

9. A system, comprising:
  a memory; and
  one or more processors coupled to the memory, wherein the memory comprises program instructions executable by the one or more processors to implement:
    a model of a materials handling facility; and
    a scheduler component configured to:
      update the model of the materials handling facility, the model indicating, for each of a plurality of distinct quantities of work undergoing a respective materials handling process in a respective location of the materials handling facility: a quantity of agent resources actively processing each quantity of work in accordance with the respective materials handling process;
      evaluate the updated model to determine that one or more additional agent resources are needed to process a particular quantity of work in accordance with a particular materials handling process;
      select a robotic agent resource processing a different quantity of work undergoing a different materials handling process from the particular materials handling process, wherein the particular materials handling process is in a distinct location from the different materials handling process; and
  wherein the program instructions are further executable by the one or more processors to:
    generate an instruction that directs the selected robotic agent resource to process the particular quantity of work via the particular materials handling process such that the selected robotic agent resource is caused to move to the distinct location to process the particular quantity of work via the particular materials handling process instead of the different quantity of work undergoing the different materials handling process that the robotic agent resource is actively performing at the time of said selecting; and
    transmit the instruction to the selected robotic agent resource such that the selected robotic agent resource is caused to move to the distinct location to process the particular quantity of work via the particular materials handling process instead of the different quantity of work undergoing the different materials handling process that the robotic agent resource is actively performing at the time of said selecting.

10. The system of claim 9, wherein the program instructions are configured to:
  determine a temporal indication of when the processing of the particular quantity of work is expected to be completed;
  wherein to evaluate the updated model to determine that the one or more additional agent resources are needed, the program instructions are configured to:
    determine that the one or more additional agent resources are needed in order to meet a particular requirement, wherein the particular requirement is a requirement to complete the processing of the particular quantity of work in accordance with the particular materials handling process no later than a time specified by the temporal indication.

11. The system of claim 9, wherein to evaluate the updated model to determine that one or more additional agent resources are needed to process the particular quantity of work in accordance with the particular materials handling process, the program instructions are configured to:
  determine that a quantity of agent resources currently processing the particular quantity of work is less than a needed quantity of agent resources for that particular quantity of work.

12. The system of claim 11, wherein the program instructions are configured to determine said needed quantity of agent resources based on:
  said particular quantity of work, a historical process rate of one or more agents, and a temporal indication of when the processing of the particular quantity of work is expected to be completed; wherein said historical process rate indicates a quantity of work performed per a particular unit of time.

13. The system of claim 9, wherein the program instructions are configured to send the generated instruction to a mobile computer system associated with and accessible by the selected robotic agent resource.

14. The system of claim 9, wherein the particular robotic agent resource selected is selected based at least in part on a context-switching time, wherein the context-switching time indicates a historical measurement of a period of time required to stop performing said different materials handling process and start performing the particular materials handling process.

15. The system of claim 9, wherein the particular robotic agent resource selected is selected based at least in part on an eligibility status of the particular robotic agent resource, the eligibility status indicating one or more materials handling processes that the particular robotic agent resource is eligible to perform.

16. The system of claim 9, wherein the selection of the robotic agent resource is at least partially dependent on one or more constraints; wherein said one or more constraints include one or more of: a capacity constraint that indicates a maximum quantity of agent resources permitted at a particular work location, and a safety constraint that indicates a limit on the period of time an agent is permitted to perform work according to a particular materials handling process.

17. A non-transitory computer-readable storage medium, storing program instructions computer-executable by one or more hardware processors of one or more computer systems to implement:
  a scheduler component configured to:
    update a model of a materials handling facility, wherein the model is stored in a data store of a materials handling facility, the model indicating, for each of a plurality of distinct quantities of work undergoing a respective materials handling process in respective locations of the materials handling facility: a quantity of agent resources actively processing each quantity of work in accordance with the respective materials handling process;
    evaluate the updated model to determine that one or more additional agent resources are needed to process a particular quantity of work in accordance with a particular materials handling process;
    select a robotic agent resource processing a different quantity of work undergoing a different materials handling process from the particular materials handling process, wherein the particular materials handling process is in a distinct location from the different materials handling process; and
  wherein the program instructions are further computer-executable to:
    generate an instruction that directs the selected robotic agent resource to process the particular quantity of work via the particular materials handling process such that the selected robotic agent resource is caused to move to the distinct location to process the particular quantity of work via the particular materials handling process instead of the different quantity of work undergoing the different materials handling process that the robotic agent resource is actively performing at the time of said selecting; and
    transmit the instruction to the selected robotic agent resource such that the selected robotic agent resource is caused to move to the distinct location to process the particular quantity of work via the particular materials handling process instead of the different quantity of work undergoing the different materials handling process that the robotic agent resource is actively performing at the time of said selecting.

18. The non-transitory medium of claim 17, wherein the program instructions are configured to:
  determine a temporal indication of when the processing of the particular quantity of work is expected to be completed;
  wherein to evaluate the updated model to determine that the one or more additional agent resources are needed, the program instructions are configured to:
    determine that the one or more additional agent resources are needed in order to meet a particular requirement, wherein the particular requirement is a requirement to complete the processing of the particular quantity of work in accordance with the particular materials handling process no later than a time specified by the temporal indication.

19. The non-transitory medium of claim 17, wherein to evaluate the updated model to determine that one or more additional agent resources are needed to process the particular quantity of work in accordance with the particular materials handling process, the program instructions are configured to:
  determine that a quantity of agent resources currently processing the particular quantity of work is less than a needed quantity of agent resources for that particular quantity of work.

20. The non-transitory medium of claim 19, wherein the program instructions are configured to determine said needed quantity of agent resources based on: said particular quantity of work, a historical process rate of one or more agents, and a temporal indication of when the processing of the particular quantity of work is expected to be completed; wherein said historical process rate indicates a quantity of work performed per a particular unit of time.

21. The non-transitory medium of claim 17, wherein the program instructions are configured to send the generated instruction to a mobile computer system associated with and accessible by the selected robotic agent resource.

22. The non-transitory medium of claim 17, wherein the particular robotic agent resource selected is selected based at least in part on a context- switching time, wherein the context_switching time indicates a historical measurement of a period of time required to stop performing said different materials handling process and start performing the particular materials handling process.

23. The non-transitory medium of claim 17, wherein the particular robotic agent resource selected is selected based at least in part on an eligibility status of the particular robotic agent resource, the eligibility status indicating one or more materials handling processes that the particular robotic agent resource is eligible to perform.

24. The non-transitory medium of claim 17, wherein the selection of an agent resource is at least partially dependent on one or more constraints;
  wherein said on or more constraints include one or more of: a capacity constraint that indicates a maximum quantity of agent resources permitted at a particular work location, and a safety constraint that indicates a limit on the period of time an agent is permitted to perform work according to a particular materials handling process.

* * * * *